US009115997B2

(12) United States Patent
Poduri et al.

(10) Patent No.: US 9,115,997 B2
(45) Date of Patent: Aug. 25, 2015

(54) MODELING CHARACTERISTICS OF A VENUE

(71) Applicant: QUALCOMM Incorporated, San Diego, CA (US)

(72) Inventors: Sameera Poduri, Santa Clara, CA (US); Payam Pakzad, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 13/915,268

(22) Filed: Jun. 11, 2013

(65) Prior Publication Data

US 2014/0365127 A1 Dec. 11, 2014

(51) Int. Cl.
*G01C 21/00* (2006.01)
*G01C 21/20* (2006.01)
*G01C 21/36* (2006.01)
*G06F 17/30* (2006.01)
*H04W 4/00* (2009.01)
*H04W 4/04* (2009.01)

(52) U.S. Cl.
CPC ............... *G01C 21/00* (2013.01); *G01C 21/20* (2013.01); *G01C 21/206* (2013.01); *G01C 21/3679* (2013.01); *G06F 17/30* (2013.01); *H04W 4/00* (2013.01); *H04W 4/04* (2013.01)

(58) Field of Classification Search
CPC ...... G01C 21/00; G01C 21/32; G01C 21/206; G01C 21/3679; G06F 17/30; H04W 4/00; H04W 4/04
USPC ........................................................ 701/433
See application file for complete search history.

(56) References Cited

U.S. PATENT DOCUMENTS

| 5,570,412 | A | 10/1996 | LeBlanc | |
|---|---|---|---|---|
| 6,421,606 | B1 * | 7/2002 | Asai et al. | 701/410 |
| 6,871,139 | B2 | 3/2005 | Liu et al. | |
| 8,077,090 | B1 * | 12/2011 | Chintalapudi et al. | 342/451 |
| 8,392,113 | B2 * | 3/2013 | Gupta et al. | 701/426 |
| 8,818,711 | B2 * | 8/2014 | Kruglick | 701/411 |

(Continued)

FOREIGN PATENT DOCUMENTS

| DE | EP2570772 | * | 2/2012 | ........... G01C 21/165 |
|---|---|---|---|---|
| WO | 2010058062 A1 | | 5/2010 | |
| WO | 2011144966 A1 | | 11/2011 | |

OTHER PUBLICATIONS

Howard, A., Siddiqi, S., & Sukhatme, G. S. (Jan. 2006). An experimental study of localization using wireless ethernet. In Field and Service Robotics (pp. 145-153). Springer Berlin Heidelberg.*

(Continued)

*Primary Examiner* — John Q Nguyen
*Assistant Examiner* — Alan D Hutchinson
(74) *Attorney, Agent, or Firm* — Silicon Valley Patent Group LLP

(57) ABSTRACT

Methods and apparatuses for modeling characteristics of a venue are disclosed. The method comprises identifying a set of constraints associated with the venue, determining a plurality of paths to be traveled by one or more mobile devices in accordance with the set of constraints, directing the one or more mobile devices to navigate the venue using the plurality of paths, receiving data collected by the one or more mobile devices, and generating a model of the venue using the data collected by the one or more mobile devices.

49 Claims, 10 Drawing Sheets

(56) References Cited

U.S. PATENT DOCUMENTS

| | | | |
|---|---|---|---|
| 2002/0077787 A1* | 6/2002 | Rappaport et al. | 702/188 |
| 2009/0187342 A1 | 7/2009 | Vavrus et al. | |
| 2010/0091677 A1 | 4/2010 | Griff et al. | |
| 2011/0137549 A1* | 6/2011 | Gupta et al. | 701/201 |
| 2011/0274000 A1* | 11/2011 | King et al. | 370/252 |
| 2012/0143495 A1 | 6/2012 | Dantu | |
| 2012/0220272 A1 | 8/2012 | Husney | |
| 2012/0225678 A1 | 9/2012 | Cha et al. | |
| 2014/0179341 A1* | 6/2014 | Sydir et al. | 455/456.1 |

OTHER PUBLICATIONS

Singh A. et al., "Efficient Informative Sensing using Multiple Robots," Journal of Artificial Intelligence Research, 2009, vol. 34, pp. 707-755.

Turner, H. et al., "Engineering Challenges of Deploying Crowd-based Data Collection Tasks to End-User Controlled Smartphones," International Workshop on Emerging Mobile Sensing Technologies, Systems, and Applications (MobiSense 2011), Jun. 12, 2011, San Francisco, CA, USA, 6 pages.

Boeing A. et al., "Cooperative Multi-Robot Navigation and Mapping of Unknown Terrain", Robotics, Automation and Mechatronics (RAM), 2011 IEEE Conference on, IEEE, Sep. 17, 2011, pp. 234-238, XP031974467, DOI: 10.1109/RAMECH.2011.6070488, ISBN: 978-1-61284-252-3.

International Search Report and Written Opinion—PCT/US2014/038242—ISA/EPO—Sep. 16, 2014.

Kaiser W.J., et al., "Networked Infomechanical Systems (NIMS) for Ambient Intelligence", UCLA Center for Embedded Networked Sensing, Technical report 31, Dec. 1, 2003, XP055138883, Retrieved from the Internet: URL:http://robotics.usc.edu/publications/media/uploads/pubs/401.pdf [retrieved on Sep. 8, 2014].

Vaughan-Nicholes, S., "How Google—and everyone else—gets Wi-Fi location data ZDNet", ZDNet, networking, Nov. 16, 2011, XP055138891, Retrieved from the Internet: URL:http://www.zdnet.com/blog/networking/how-google-and-everyone-else-gets-wi-fi-location-data/1664 [retrieved on Sep. 8, 2014].

* cited by examiner

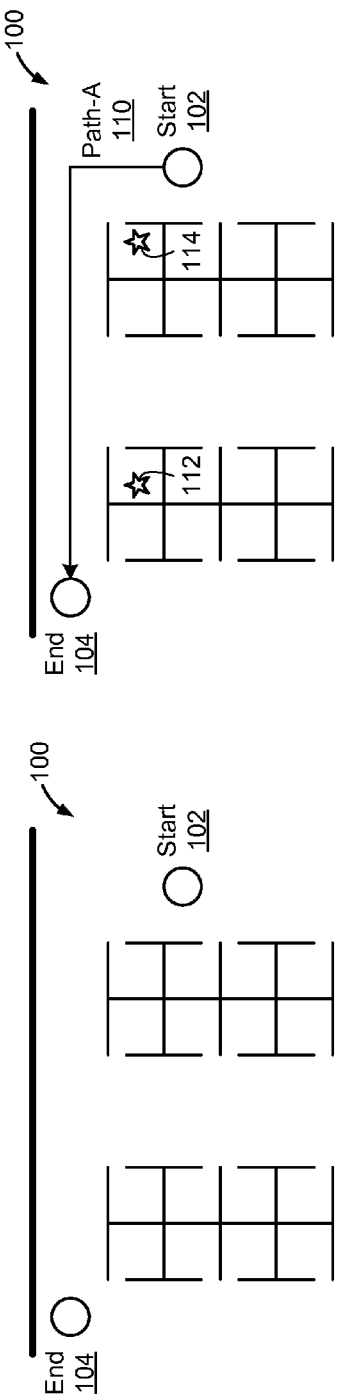
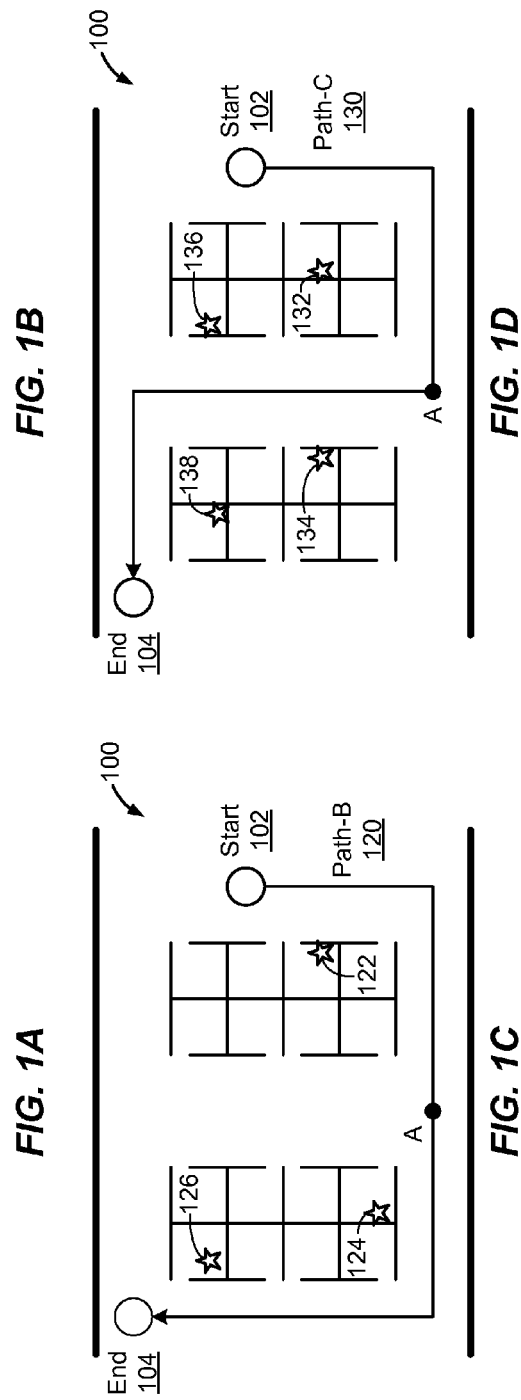
FIG. 1A
FIG. 1B
FIG. 1C
FIG. 1D

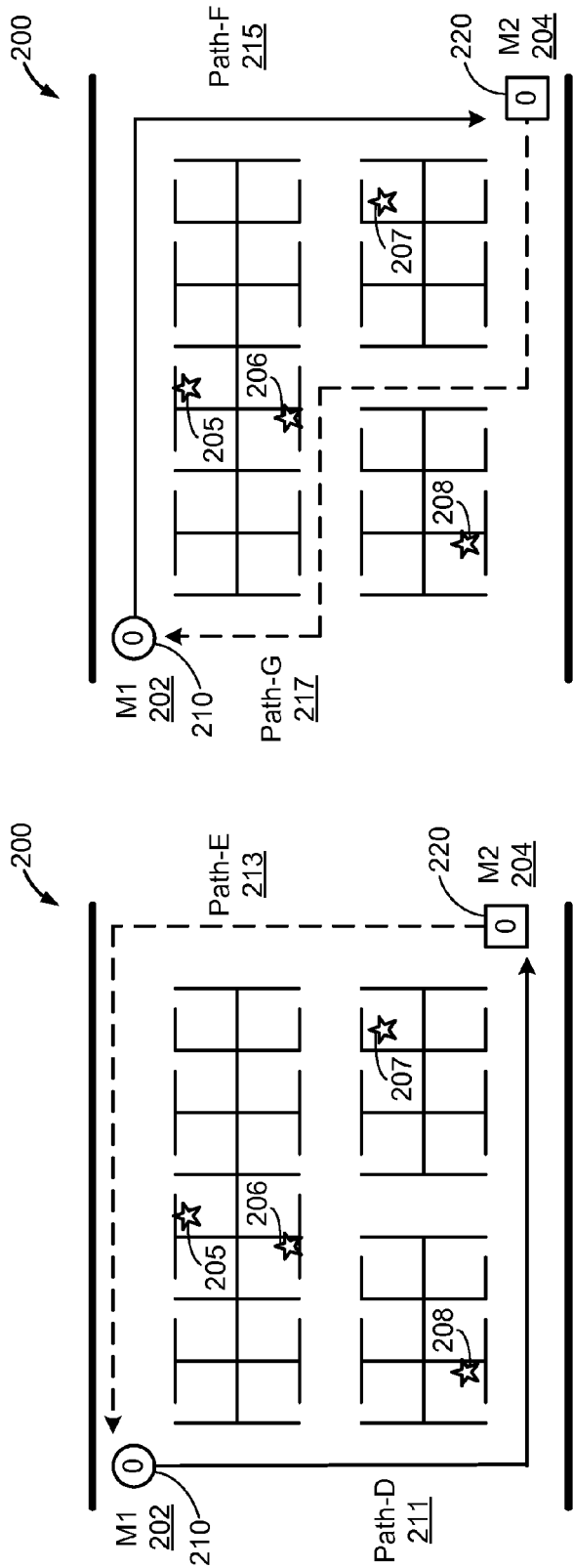

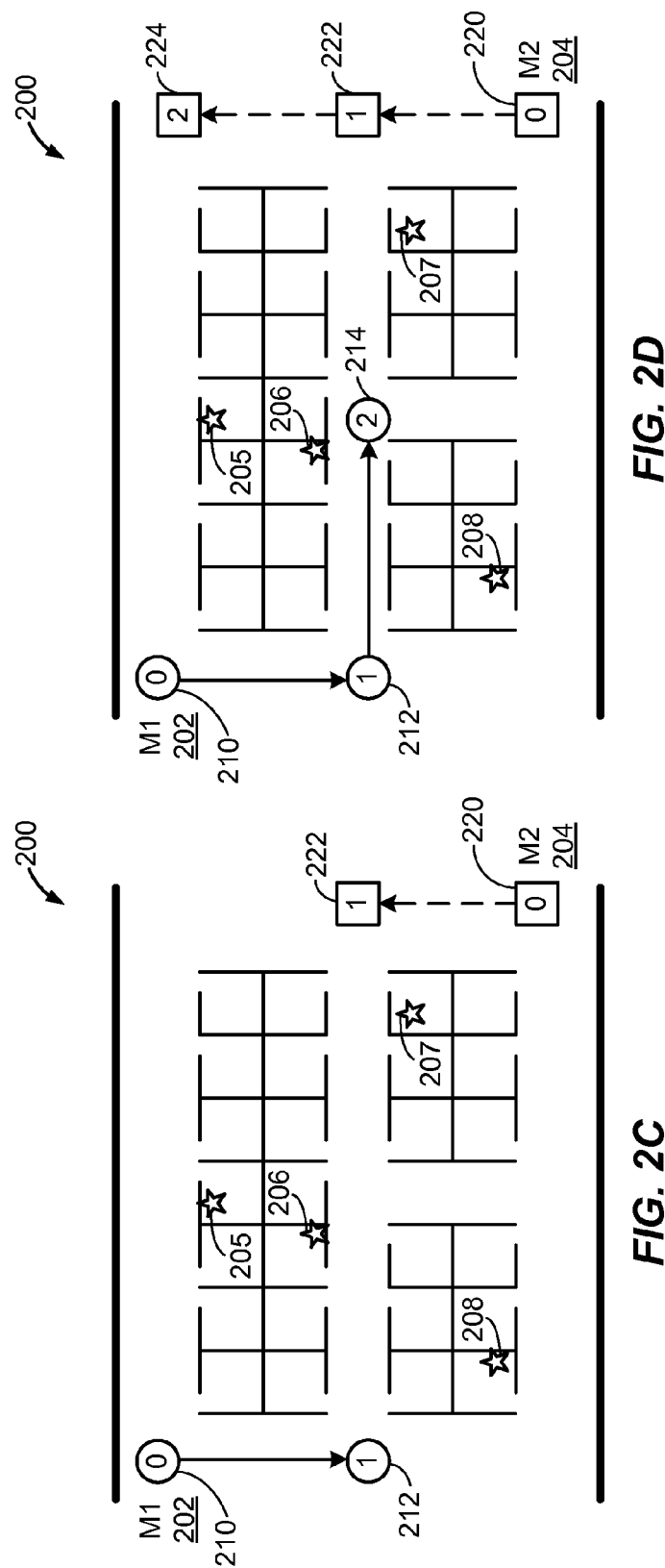

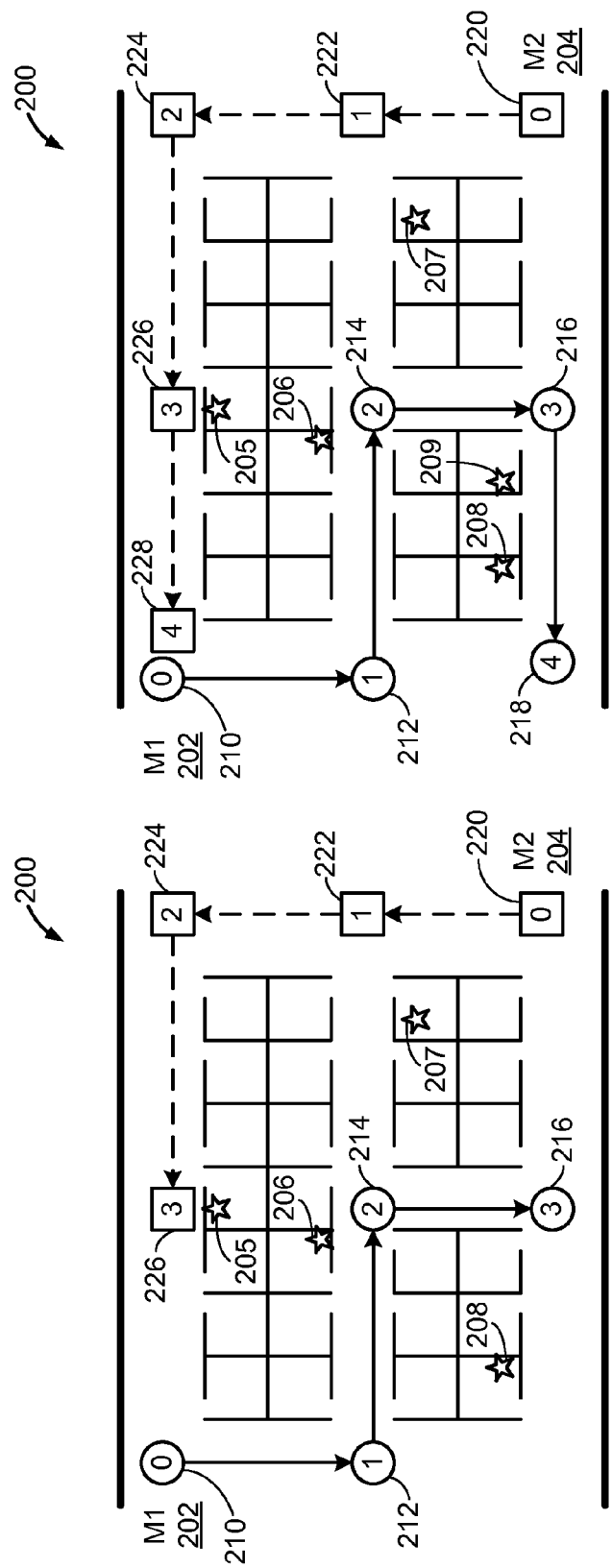

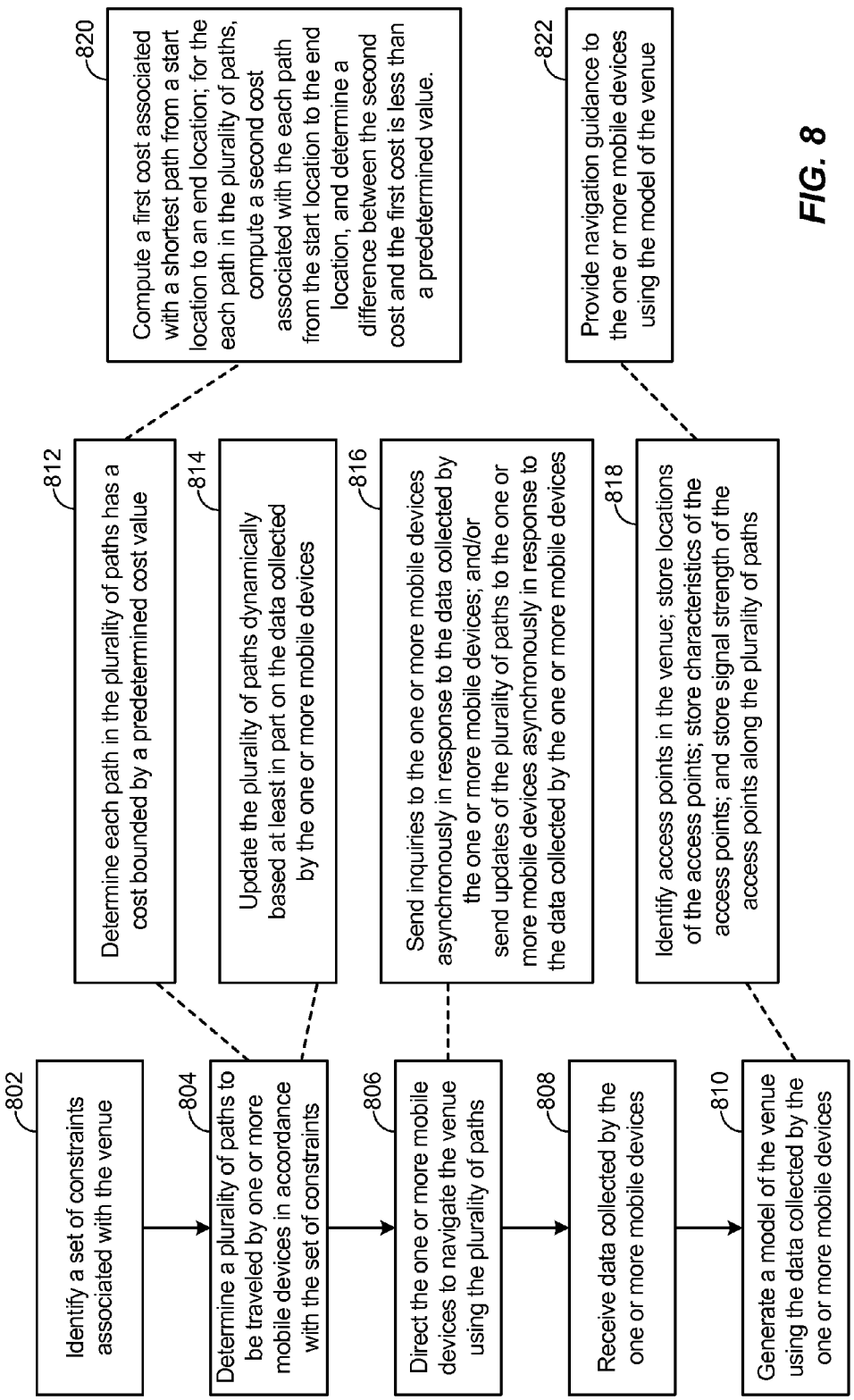

MODELING CHARACTERISTICS OF A VENUE

FIELD

The present disclosure relates to the field of wireless communications. In particular, the present disclosure relates to modeling characteristics of a venue.

BACKGROUND

The position of a mobile station, such as, for example, a cellular telephone, may be estimated based on information gathered from various systems. One such system may comprise the Global Positioning System (GPS), which is one example of a satellite positioning system (SPS). SPS systems such as GPS may comprise a number of space vehicles (SV) orbiting the earth. Another example of a system that may provide a basis for estimating the position of a mobile station is a cellular communication system comprising a number of terrestrial base stations to support communications for a number of mobile stations.

A position estimate, which may also be referred to as a position "fix", for a mobile station may be obtained based at least in part on distances or ranges from the mobile station to one or more transmitters, and also based at least in part on the locations of the one or more transmitters. Such transmitters may comprise SVs in the case of an SPS and/or terrestrial base stations in the case of a cellular communications system, for example. Ranges to the transmitters may be estimated based on signals transmitted by the transmitters and received at the mobile station. The location of the transmitters may be ascertained, in at least some cases, based on the identities of the transmitters, and the identities of the transmitters may be ascertained from signals received from the transmitters. The SPS technology works in most outdoor environments, however, in some indoor venues, these signals can be weak or unavailable. In such situations, the characteristics of an indoor venue may be used in providing positioning and navigation for mobile devices.

Therefore, it is desirable to have method and apparatus for modeling characteristics of a venue.

SUMMARY

The present disclosure relates to modeling characteristics of a venue. According to embodiments of the present disclosure, a method of modeling characteristics of a venue comprises identifying a set of constraints associated with the venue, determining a plurality of paths to be traveled by one or more mobile devices in accordance with the set of constraints, directing the one or more mobile devices to navigate the venue using the plurality of paths, receiving data collected by the one or more mobile devices, and generating a model of the venue using the data collected by the one or more mobile devices.

In yet another embodiment, an apparatus including processing logic, where the processing logic comprises logic configured to identify a set of constraints associated with the venue, logic configured to determine a plurality of paths to be traveled by one or more mobile devices in accordance with the set of constraints, logic configured to direct the one or more mobile devices to navigate the venue using the plurality of paths, logic configured to receive data collected by the one or more mobile devices, and logic configured to generate a model of the venue using the data collected by the one or more mobile devices.

In yet another embodiment, a non-transitory medium storing instructions for execution by one or more computer systems, the instructions comprise code for identifying a set of constraints associated with the venue, code for determining a plurality of paths to be traveled by one or more mobile devices in accordance with the set of constraints, code for directing the one or more mobile devices to navigate the venue using the plurality of paths, code for receiving data collected by the one or more mobile devices, and code for generating a model of the venue using the data collected by the one or more mobile devices.

In yet another embodiment, a mobile device for modeling characteristics of a venue comprises one or more processors including processing logic, the processing logic comprises logic configured to receive from a server a plurality of paths to be traveled in accordance with a set of constraints associated with a venue, logic configured to navigate the venue using the plurality of paths, logic configured to collect data observed from the plurality of paths, and logic configured to report data collected to the server.

In yet another embodiment, an apparatus comprises means for identifying a set of constraints associated with a venue, means for determining a plurality of paths to be traveled by one or more mobile devices in accordance with the set of constraints, means for directing the one or more mobile devices to navigate the venue using the plurality of paths, means for receiving data collected by the one or more mobile devices, and means for generating a model of the venue using the data collected by the one or more mobile devices.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

FIGS. 1A-1D illustrate a method of modeling characteristics of a venue according to aspects of the present disclosure.

FIGS. 2A-2F illustrate another method of modeling characteristics of a venue according to aspects of the present disclosure.

FIG. 8 illustrates a flow chart of a method for modeling characteristics of a venue according to some aspects of the present disclosure.

Like numbers are used throughout the figures.

DESCRIPTION OF EMBODIMENTS

Figure 3:
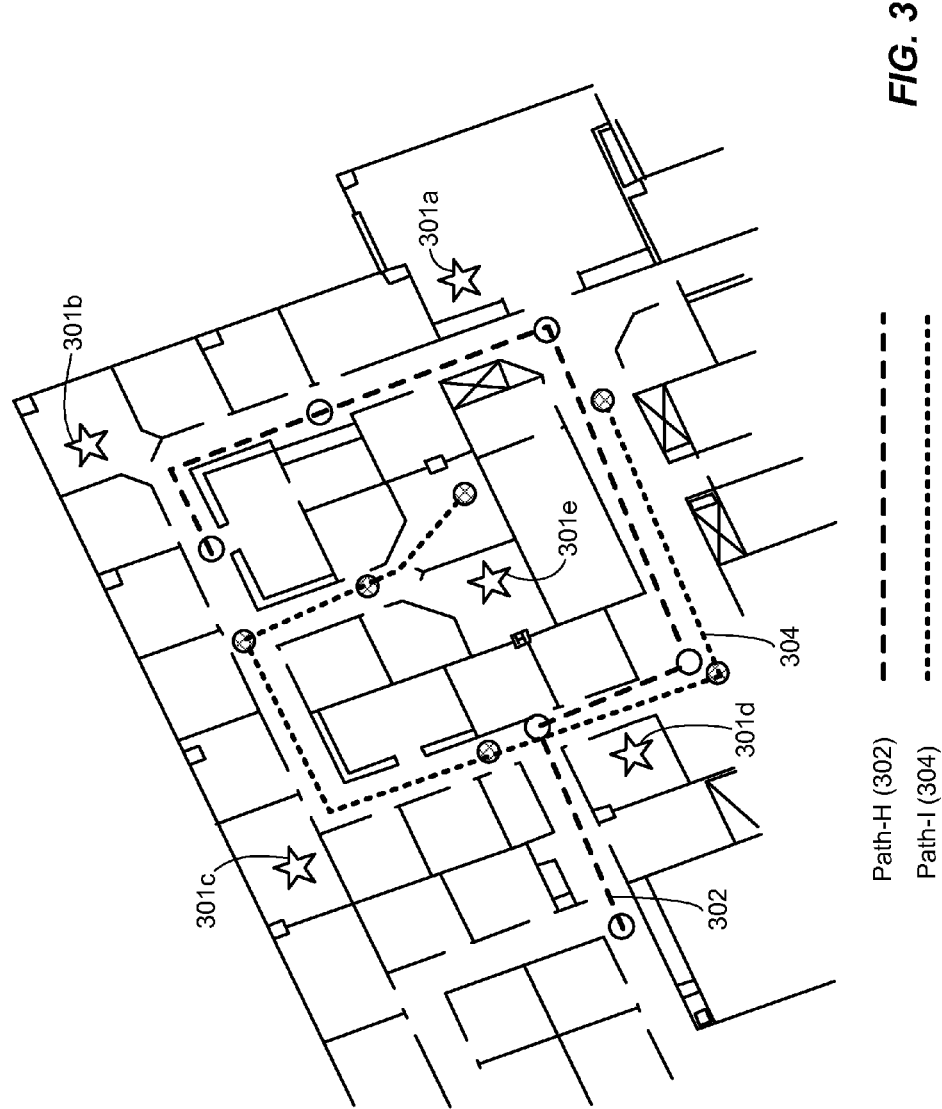
FIG. 3 illustrates a method of using crowdsourcing to model characteristics of a venue according to some aspects of the present disclosure.

Embodiments of method, apparatus, mobile device, and computer program product for modeling characteristics of a venue are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

FIGS. 1A-1D illustrate a method of modeling characteristics of a venue according to aspects of the present disclosure. For illustration purposes, a venue 100 is substantially simplified as shown in FIG. 1A. Solid lines represent walls or boundaries that may not be passed through. According to aspects of the present disclosure, a venue may include any indoor or outdoor environment, such as an airport terminal, a shopping mall, an office building, a garden, a park, etc. According to aspects of the present disclosure, characteristics of a venue may be represented as points of interest from which information may be gathered. Characteristics of a venue may include any location-dependent signal or any kind of electromagnetic wave signals. For example, characteristics of a venue may include, but not limited to: audio beacons, ultrasound beacons, visible light signatures, wireless signals, cellular signals, Bluetooth signals, magnetic anomaly map, etc. In this example, a single mobile client is employed to gather information about the venue 100. To model characteristics of the venue 100, a number of paths may be formed to go from a start location 102 to an end location 104 as shown in FIGS. 1B-1D. FIG. 1B illustrates a possible path to go from start location 102 to end location 104. In this example, Path-A 110 may be selected based on potential points of interest in the venue shown in FIG. 1B. Along Path-A 110, points of interest, such as 112 and 114 (each shown as a star) and their corresponding data may be detected, observed and collected. According to aspects of the present disclosure, the points of interest may include access points, locations of the access points, characteristics of the access points, and signal strength of the access points along the multiple paths to be traveled by the mobile clients in the venue 100. In addition, the points of interest may further include physical aspects of the venue, including but not limited to locations of walls, doors, walkways, elevators, stairways of the venue.

FIG. 1C illustrates another possible path to go from start location 102 to end location 104. In this example, Path-B 120 may be selected based on potential points of interest in the venue shown in FIG. 1C. Along Path-B 120, points of interest, such as 122, 124, and 126 and their corresponding data may be detected, observed and collected. FIG. 1D illustrates yet another possible path to go from the start location 102 to the end location 104. In this example, Path-C 130 may be selected based on potential points of interest in the venue shown in FIG. 1D. Along Path-C 130, points of interest, such as 132, 134, 136, and 138 and their corresponding data may be detected, observed and collected. According to aspects of the present disclosure, to increase the amount of information to be gathered, it is not necessarily for the path from the start location 102 to the end location 104 being the shortest path. For example, other possible paths, such as Path-B 120 in FIG. 1C and Path-C 130 in FIG. 1D may enable to mobile client to obtain more information about the venue as opposed to taking the shortest path from the start location 102 to the end location 104, as shown in FIG. 1B.

In some implementations, the path to be used may be dynamically adjusted in order to increase the information that may be gathered, based on the points of interest detected or observed along the path from the start location 102 to the end location 104. For example, in the situation of FIG. 1B, Path-A 110 may be used to allow a crowdsourcing client to go near points of interests 112 and 114, so as to increase the amount of information that may be collected from 112 and 114. Similarly, in the situation of FIG. 1C, Path-B 120 may be used to allow a crowdsourcing client to go near points of interests 122, 124 and 126, thus to increase the amount of information that may be collected from points of interest 122, 124 and 126. In in the situation of FIG. 1D, Path-C 130 may be used to allow a crowdsourcing client to go near points of interests 132, 134, 136 and 138, thus to increase the amount of information that may be collected from points of interest 132, 134, 136 and 138. Note that Path-B 120 and Path-C 130 may share part of the same path until Point A. Based on the particular situation in FIG. 1D, Path-C 130 can be dynamically adjusted after Point A to allow the mobile client to increase information to be obtained from points of interest 134, 136 and 138. In other implementations, the start location 102 and the end location 104 may be adjusted to different locations in the venue in order to increase the information that may be obtained, based on the points of interest that have already been detected or observed along a path.

FIGS. 2A-2F illustrate another method of modeling characteristics of a venue according to aspects of the present disclosure. For illustration purposes, venue 200 is substantially simplified as shown in FIG. 2A. Solid lines represent walls or boundaries that may not be passed through. In this example, two mobile clients M1 (202) and M2 (204) are employed to gather information about the venue 200. To model characteristics of the venue 200, a number of paths may be formed to provide different coverage of the venue 200 as shown in FIGS. 2A-2B.

FIG. 2A illustrates a set of possible paths to cover the venue, based on locations of potential points of interest. As shown in FIG. 2A, one possible set of paths, Path-D 211 and Path-E 213 may be used. In this example, Path-D 211 (drawn as solid line) may be traversed by mobile client M1 (202) and Path-E 213 (drawn as dotted line) may be traversed by mobile client M2 (204). The start location of M1 is at 210 and the start location of M2 is at 220. Using Path-D 211 and Path-E 213, mobile clients 202 and 204 may detect, observe, and gather data about points of interest 205, 206, 207 and 208 in the venue. Alternatively, FIG. 2B illustrates another set of possible paths to cover the venue, based on locations of potential points of interest. As shown in FIG. 2B, a possible set of paths, Path-F 215 and Path-G 217 may be used. In this example, Path-F 215 (drawn as solid line) may be traversed by mobile client M1 (202) and Path-G 217 (drawn as dotted line) may be traversed by mobile client M2 (204). Using Path-F 215 and Path-G 217, mobile clients 202 and 204 may detect, observe, and gather data about points of interest 205, 206, 207 and 208 in the venue 200.

FIGS. 2C-2F illustrate a method of dynamically adjusting a set of paths for modeling characteristics of a venue according to aspects of the present disclosure. Note that the same venue is shown in FIGS. 2C-2F as in FIGS. 2A-2B, for simplicity of description, new features will be described in association with FIGS. 2C-2F, and the features described in FIGS. 2A-2B will not be repeated. In FIG. 2C, mobile client 202 moves from location 210 (shown as circle 0) at time $T_0$ to location 212 (shown as circle 1) at time $T_1$; mobile client 204 moves from location 220 (shown as square 0) at time $T_0$ to location 222 at time $T_1$ (shown as square 1). So far, the paths taken may be the same as the predetermined paths shown in FIG. 2A. In FIG. 2D, mobile client 202 moves from location 212 (shown as circle 1) at time $T_1$ to location 214 (shown as circle 2) at time $T_2$; mobile client 204 moves from location 222 (shown as square 1) at time $T_1$ to location 224 at time $T_2$ (shown as square 2). Here, a first dynamic adjustment is made with respect to the path taken by mobile client 202 as compared to the predetermined path shown in FIG. 2A. By making this dynamic adjustment, mobile client 202 may gather more information about the point of interest 206.

In FIG. 2E, mobile client 202 moves from location 214 (shown as circle 2) at time $T_2$ to location 216 (shown as circle 3) at time $T_3$; mobile client 204 moves from location 224 (shown as square 2) at time $T_2$ to location 226 at time $T_3$ (shown as square 3). In FIG. 2F, mobile client 202 moves from location 216 (shown as circle 3) at time $T_3$ to location 218 (shown as circle 4) at time $T_4$; mobile client 204 moves from location 226 (shown as square 3) at time $T_3$ to location 228 at time $T_4$ (shown as square 4). Here, a second dynamic adjustment is made with respect to the path taken by mobile client 202 as compared to the predetermined path shown in FIG. 2A. By taking a new path from 216 to 218, the mobile client 202 may gather more information about a newly added point of interest 209. As a result, the end location 218 may be different for mobile client 202 than the predetermined end location in FIG. 2A.

Note that the above example shows the mobile clients 202 and 204 may move in synchronization with each other going through their respective paths at times $T_1$, $T_2$, $T_3$, and $T_4$. In other implementations, the mobile clients 202 and 204 may move though their respective paths in an asynchronous manner, and they may be at different locations from the ones shown in FIGS. 2C-2F at times $T_1$, $T_2$, $T_3$, and $T_4$. In addition, the communication between a server and the mobile clients 202 and 204 may be asynchronous. In other words, commands and/or inquiries may be received at each mobile client at different times, which may direct each of the mobile clients to take different paths in order to maximize the information to be obtained from the different paths.

According to aspects of the present disclosure, the environment within venue 200 may change dynamically. For example, in FIG. 2F, a new point of interest 209 may be introduced after time $T_3$. In response to this new point of interest 209, the mobile client 202 may be directed to move take a new path, such as to move from location 216 to location 218. In this manner, information obtained may be maximized by taking the new path from location 216 to 218, allowing the mobile client 202 to gather information about the point of interest 209. In other situations, a point of interest, such as any one of 205, 206, 207, and 208, may be removed from the venue (not shown); and in response to this change, the paths taken by mobile clients 202 and 204 may be altered in order to maximize the information to be obtained from the altered paths. As a result of the paths traveled by the mobile clients may be adjusted, the end locations of the corresponding paths may also be adjusted.

Figure 4:
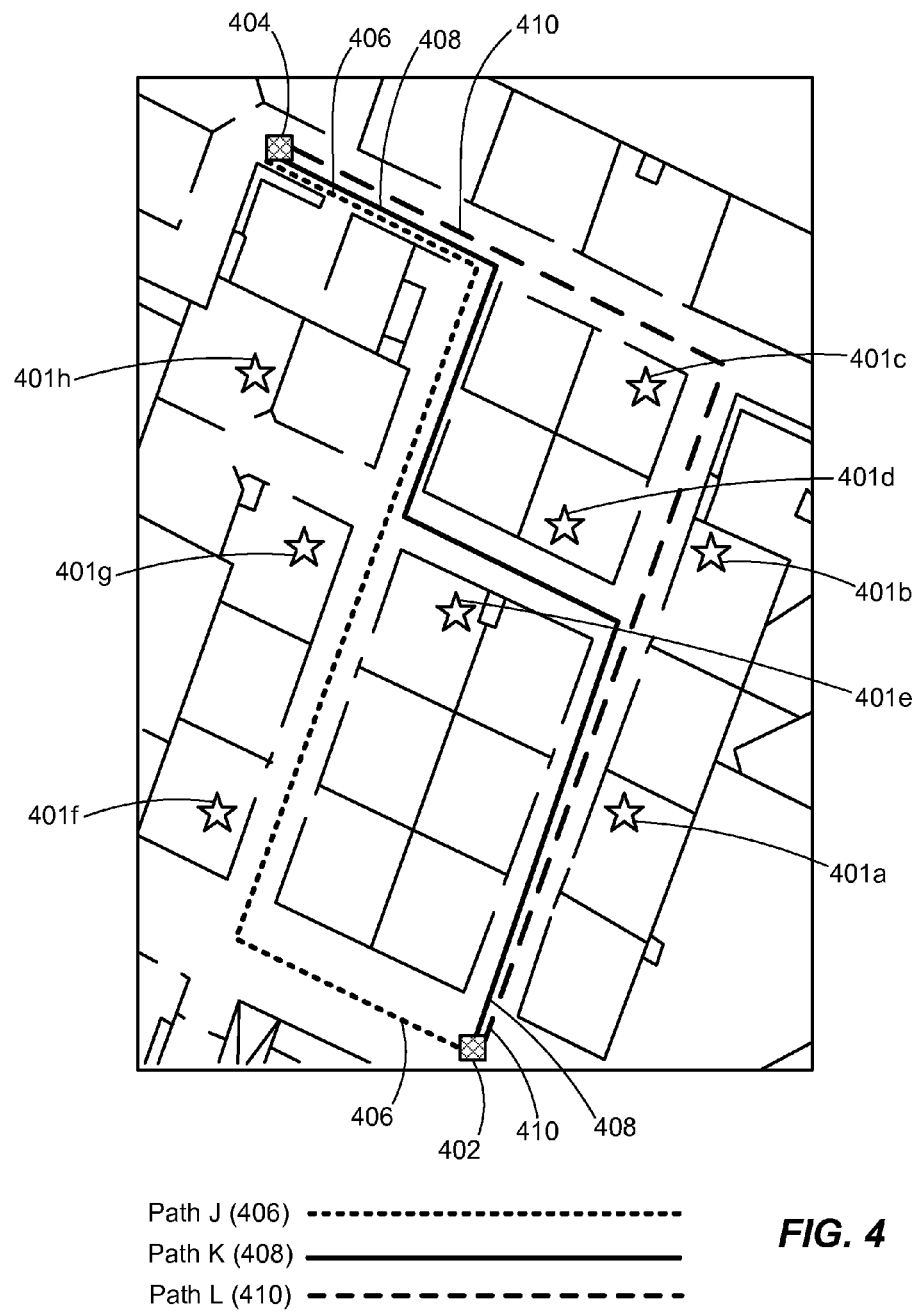
FIG. 4 illustrates a method of using survey to model characteristics of a venue according to some aspects of the present disclosure.

According to aspects of the present disclosure, systems (indoor/outdoor) can use WiFi information as an input for positioning/navigation applications. In some cases, partial information may be available about the positions of access points or the WiFi models, which may be hardware and environment specific. These WiFi models and access point positions can be learnt on-the-fly through crowdsourcing as shown in FIG. 3 or may be discovered through surveyed data as shown in FIG. 4. According to aspects of the present disclosure, it may be likely that WiFi characteristics of a venue may need to be updated frequently as the environment may change, for example, APs may be moved or may be added or removed, or the physical environment of the venue may change.

According to aspects of the present disclosure, updates of characteristics of a venue may be performed based on measurements gathered at different locations in the venue. As shown in association with FIG. 3 and FIG. 4, data may be collected using various methods, including but not limited to: 1) a survey where surveyors can be sent to a venue with the explicit purpose of gathering measurements; and 2) crowdsourcing where measurements are collected in an ad-hoc way by users of the positioning system. For both these scenarios, there may be constraints on how many measurements can be taken. For instance, a surveyor may have a constraint on the length of the paths or amount of survey time available; whereas in the crowdsourcing scenario, there may be constraints on the start location and end location of the paths.

According to aspects of the present disclosure, measurements at different locations in the map may contribute different amounts of information for learning of the model and access point positions. Given constraints on the measurement path, such as start location and end location, or the length of the path, and number of surveyors/users, the proposed solution provides one or more measurement paths based on the incremental information content of each path.

FIG. 3 illustrates a method of using crowdsourcing to model characteristics of a venue according to some aspects of the present disclosure. For simplicity of illustration, two paths, namely Path-H (302) and Path-I (304), to be traveled by two mobile clients are shown in this exemplary implementation. In other implementations, multiple paths to be traveled by multiple mobile clients may also be supported by the current disclosure. In this venue, multiple points of interest 301a, 301b, 301c, 301d, and 301e (for example representing access points), may exist from which the mobile clients may observe and gather information by surveying the venue. According to aspects of the present disclosure, in the crowdsourcing scenario shown in FIG. 3, given a map and measurement constraints, the paths that maximize total information gain may be determined. Example constraints may include but not limited to path length, measurement time, and number of surveyors. In this example, two survey paths with the same number of measurements may be made. One path may be more 'informative' than the other path. In other implementations, different number of measurements may be made in different survey paths. Information gathered from the different paths may be combined to model the characteristics of the venue.

FIG. 4 illustrates a method of using survey to model characteristics of a venue according to some aspects of the present disclosure. In the survey scenario shown in FIG. 4, the starting location 402 and destination location 404 may be predetermined. The three paths such as 406, 408, and 410 to be traveled by three mobile clients may be determined to maximize information to be obtained about the points of interest in the venue. For example, Path-K 408 may be configured to maximize information obtained about points of interest 401a, 401b, 401c and 401d; Path-L 410 may be configured to maximize information obtained about points of interest 401a, 401d, 401e, 401g, and 401h; Path-J 406 may be configured to maximize information obtained about points of interest 401e, 401f, 401g, and 401h. The three paths may provide different information values.

According to aspects of the present disclosure, in the survey scenario shown in FIG. 4, given a map and measurement constraints, a strategy to propose different paths to different users may be determined such that the total information gain can be maximized. Example constraints may include but not limited to: start location and end location for different users, deviation of proposed path from the shortest path, and expected number of participants. FIG. 4 illustrates an example with three different paths for the same start and end locations.

According to aspects of the present disclosure, a map may be discretized into finite number of measurement locations V. For each location A belongs to V, I(A) is the information gain of making measurements at A. There is a cost C(u,v) for travelling from u to v in V. A cost of a path C(P) may be obtained. Using this notation the informative path planning may be defined as follows.

First, for the scenario of multiple-surveyors and fixed path budget, a collection of k paths, $P_1, P_2, \ldots P_k$, may be determined such that each path has a bounded cost C(Pi)≤Bi, and the paths may be chosen to be most informative, i.e., the total information obtained may be maximized.

Second, for the scenario of multiple-users, fixed start-end locations, and bounded deviation a collection of k paths, $P_1, P_2, \ldots P_k$, may be determined such that each path has fixed start and end location, $s_i$ and $t_i$, and a bounded deviation from the shortest path from $s_i$ to $t_i$, C(Pi)−C(Pi)≤D, and the paths may be chosen to be most informative, i.e., the total information obtained may be maximized.

According to aspects of the present disclosure, the NP-hard method can be used to optimize for mutual information to be obtained. In some implementations, a greedy sequential algorithm may be employed that provides a near-optimal solution. An example of a greedy sequential algorithm is described in "Efficient Informative Sensing using Multiple Robots", by Singh et al., Journal of Artificial Intelligence Research 34 (2009), pages 707-755. The above referenced article is incorporated herein in its entirety by reference. In one approach, non-adaptive algorithms may be used, which plan and commit to the paths before any measurements are made. In another approach, adaptive algorithms may be used, which may dynamically update and re-plan as new information becomes available.

Figure 5:
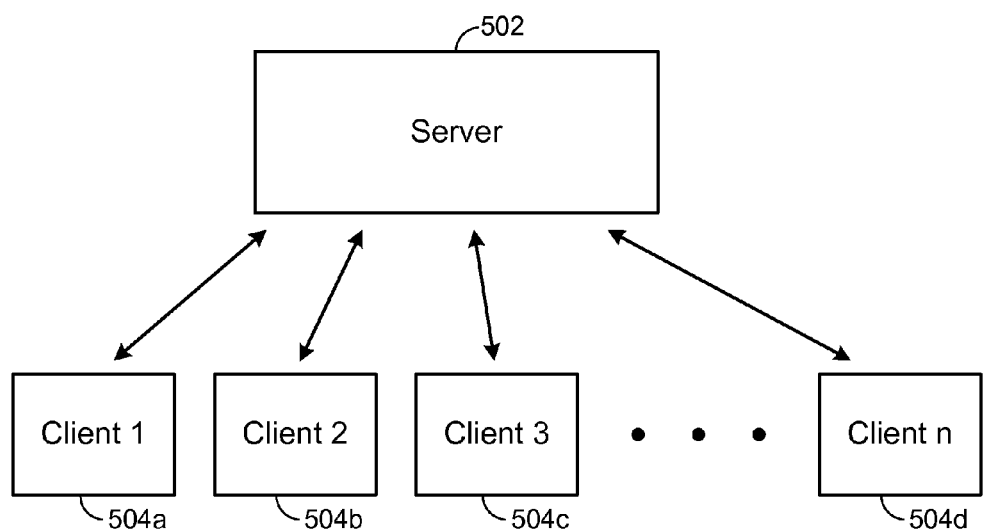
FIG. 5 illustrates an exemplary client-server environment for modeling characteristics of a venue according to some aspects of the present disclosure.

FIG. 5 illustrates an exemplary client-server environment for modeling characteristics of a venue according to some aspects of the present disclosure. In the present disclosure, a mobile client may also be referred to as a mobile device or mobile station. As shown in FIG. 5, for modeling characteristic of a venue, server 502 may be communicatively coupled to multiple mobile clients, such as 504a, 504b, 504c, and 504d. In some applications, server 502 may communicate common messages with all the mobile clients at the same time. In other applications, server 502 may communicate mobile client specific messages with the each of the mobile client asynchronously at different times. According to aspects of the present disclosure, in some applications, the mobile clients may be configured to collect data for server 502 through crowdsourcing; and the mobile clients may be configured to receive directions/inquiries interactively from server 502 about the different paths to navigate in a venue. In some other applications, the mobile clients may be configured to collect data through different paths predetermined by server 502 through predetermined survey paths; and the mobile clients may be configured to follow the different survey paths to navigate the venue.

Figure 6:
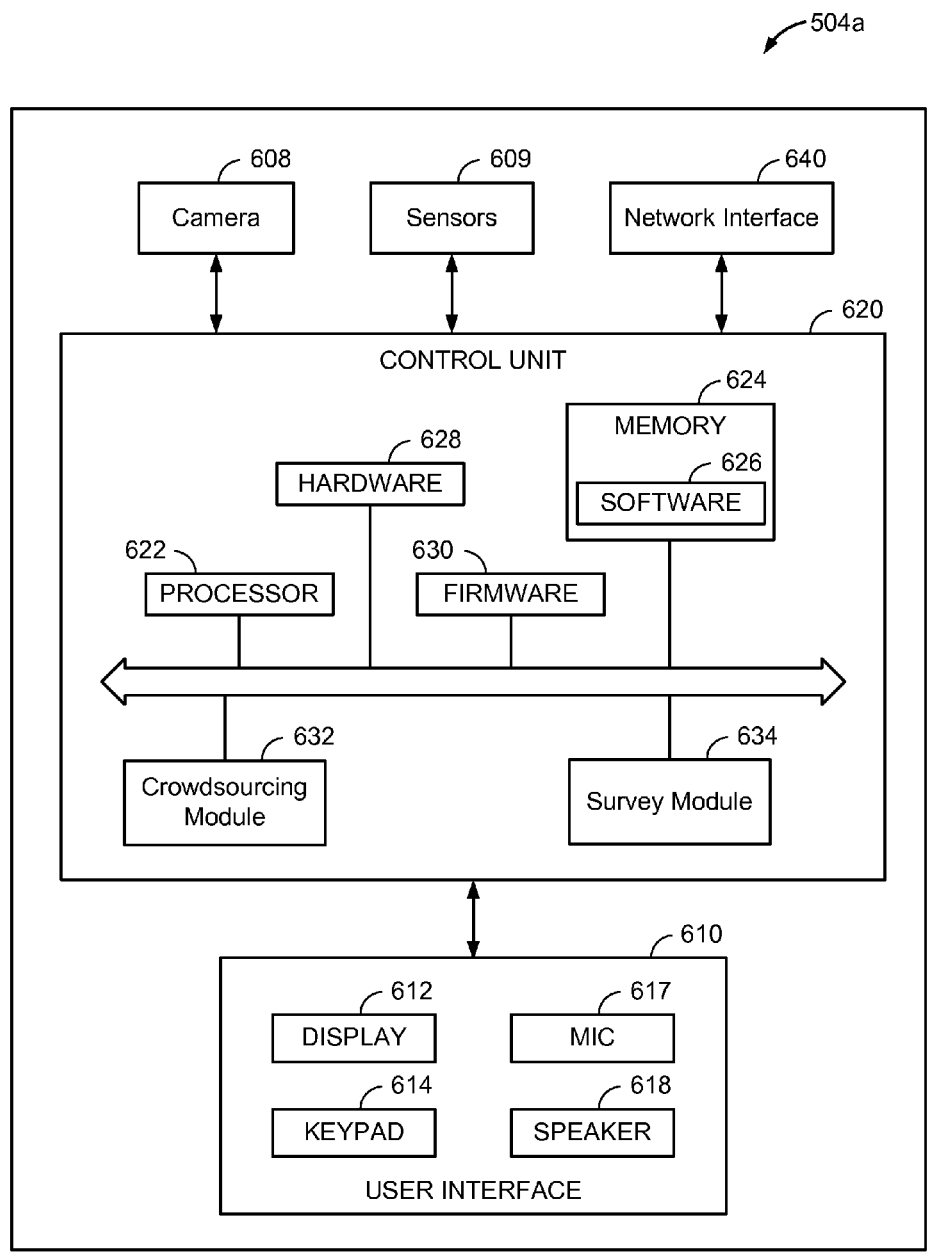
FIG. 6 illustrates an exemplary mobile client according to aspects of the present disclosure.

FIG. 6 illustrates an exemplary mobile client according to aspects of the present disclosure. In the exemplary implementation shown in FIG. 6, a mobile client (for example each of 504a, 504b, 504c, and 504d) may include a camera 608, which may be configured to capture images of a venue. The mobile client may also include sensors 609, which may be configured to gather various information in the venue. Examples of sensors that may be used with the mobile client include RFID sensors, NFC sensors, accelerometers, quartz sensors, gyros, micro-electromechanical system (MEMS) sensors used as linear accelerometers, as well as magnetometers. The mobile client may include a network interface 640 for communicating with server 502, where the network interface 640 may be configured to interface with wired and/or wireless networks.

The mobile client may also include a user interface 610 that includes display 612 capable of displaying images. The user interface 610 may also include a keypad 614 or other input device through which the user can input information into the mobile client. If desired, the keypad 614 may be obviated by integrating a virtual keypad into the display 612 with a touch sensor. The user interface 610 may also include a microphone 617 and one or more speakers 618, for example. Of course, the mobile client may include other components unrelated to the present disclosure.

The mobile client further includes a control unit 620 that is connected to and communicates with the network interface 640, as well as the user interface 610, along with any other desired features. The control unit 620 may be provided by one or more processors 622 and associated memory/storage 624. The control unit 620 may also include software 626, as well as hardware 628, and firmware 630. The control unit 620 includes a crowdsourcing module 632, and a survey module 634. The crowdsourcing module may be configured to observe and gather information about a venue via methods of crowdsourcing. The survey module 634 may be configured to assist server 502 to survey and gather information about the venue based on a set of predetermined paths provided by server 502. The crowdsourcing module 632 and survey module 634 are illustrated separately from processor 622 and/or hardware 628 for clarity, but may be combined and/or implemented in the processor 622 and/or hardware 628 based on instructions in the software 626 and the firmware 630.

Figure 7:
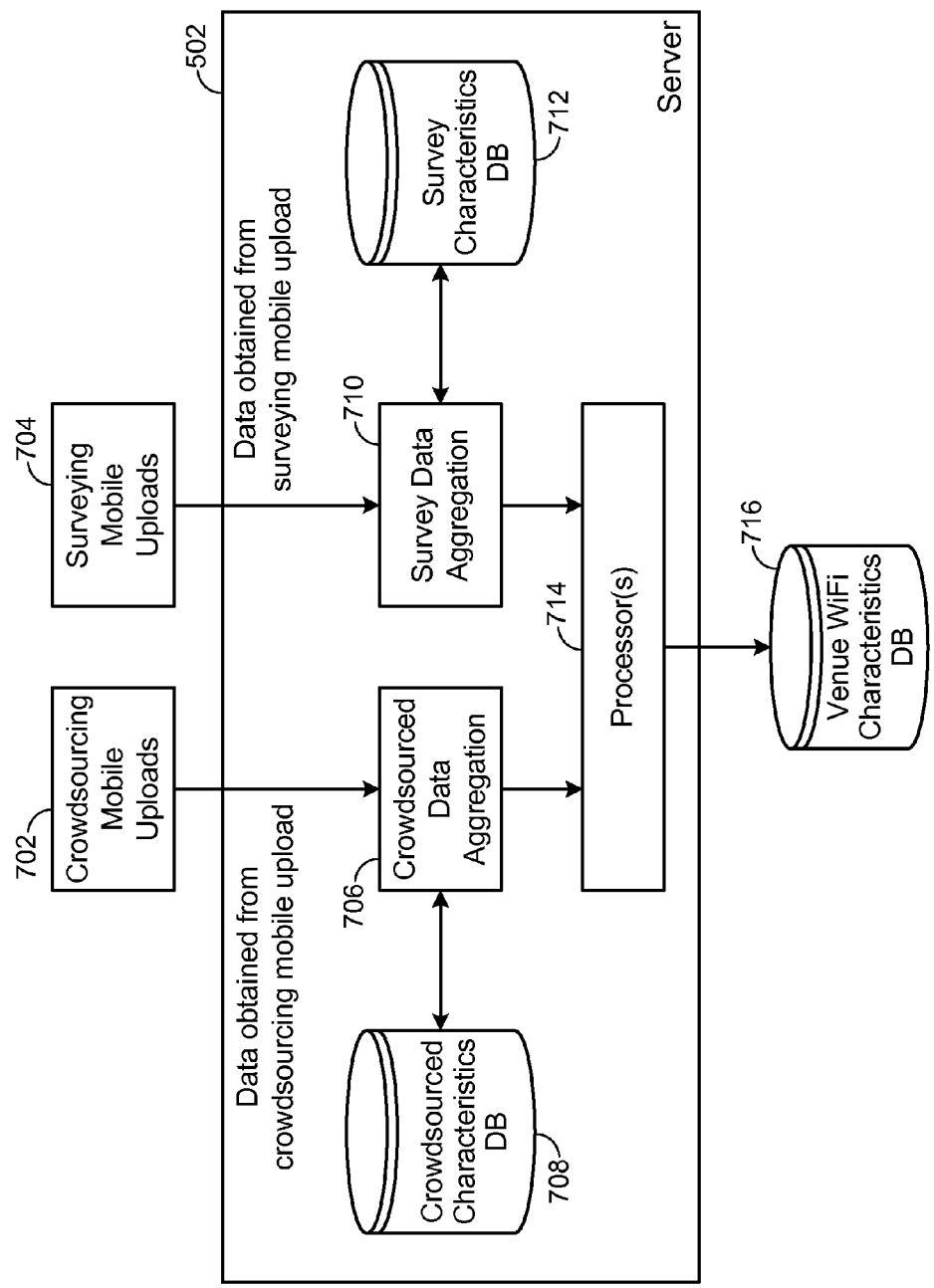
FIG. 7 illustrates an exemplary server for collecting survey data and crowdsourcing data according to aspects of the present disclosure.

FIG. 7 illustrates an exemplary server for collecting survey data and crowdsourcing data according to aspects of the present disclosure. In the example shown in FIG. 7, server 502 includes crowdsourced data aggregation unit 706, crowdsourced characteristics database (DB) 708, survey data aggregation unit 710, survey characteristics DB 712, and processor(s) 714. The crowdsourced data aggregation unit 706 receives data from crowdsourcing mobile uploads 702 and stores the data in the crowdsourced characteristics DB 708. Similarly, the survey data aggregation unit 710 receives data from surveying mobile uploads 704 and stores the data in the survey characteristics DB 712. The processor(s) 714 receives data from both the crowdsourced data aggregation unit 706 and the survey data aggregation unit 710 and stores the integrated data in venue characteristics DB 716. In some implementations, the venue characteristics DB 716 may reside within server 502. According to aspects of the present disclosure, the crowdsourced data aggregation unit 706 and the survey data aggregation unit 710 can be two parallel operations. At the end of each operation process, the results can be saved in their respectively databases. The results from both operations can be combined by processor(s) 714.

According to aspects of the present disclosure, the functions described in FIG. 8 may be implemented by the processor(s) 714 of FIG. 7, potentially in combination with one or more other elements. In some implementations, the functions of the crowdsourced data aggregation unit 706 and the survey data aggregation unit 710 can also be implemented by processor(s) 714. In some other implementations, the functions may be performed by processor, software, hardware, and firmware or a combination of the above to perform various functions of server 502 described in the present disclosure.

FIG. 8 illustrates a flow chart of a method for modeling characteristics of a venue according to some aspects of the present disclosure. In block 802, the processor 714 can be configured to identify a set of constraints associated with the venue. In block 804, the processor 714 can be configured to determine a plurality of paths to be traveled by one or more mobile devices in accordance with the set of constraints. In block 806, the processor 714 can be configured to direct the one or more mobile devices to navigate the venue using the plurality of paths. In block 808, the processor 714 can be configured to receive data collected by the one or more mobile devices. In block 810, the processor 714 can be configured to generate a model of the venue using the data collected by the one or more mobile devices.

According to aspects of the present disclosure, the set of constraints comprises number of measurements to be taken, and number of mobile devices to navigate the venue using the plurality of paths. The set of constraints further comprises boundaries described in a map of the venue, a start location, an end location, path length, and measurement time.

According to embodiments of the present disclosure, the methods performed in block 804 may further include methods performed in blocks 812 and 814. Methods performed in block 812 may further include methods performed in block 820. In block 812, the processor 714 can be configured to determine each path in the plurality of paths has a cost bounded by a predetermined cost value. In block 820, the processor 714 can be configured to compute a first cost associated with a shortest path from a start location to an end location; for the each path in the plurality of paths, compute a second cost associated with the each path from the start location to the end location, and determine a difference between the second cost and the first cost is less than a predetermined value. Note that the at least one path in the plurality of paths is different than the shortest path from the start location to the end location. In block 814, the processor 714 can be configured to update the plurality of paths dynamically based at least in part on the data collected by the one or more mobile devices.

According to embodiments of the present disclosure, the methods performed in block 806 may further include methods performed in block 816. In block 816, the processor 714 can be configured to send inquiries to the one or more mobile devices asynchronously in response to the data collected by the one or more mobile devices, and/or send updates of the plurality of paths to the one or more mobile devices asynchronously in response to the data collected by the one or more mobile devices. According to aspects of the present disclosure, the communication between a server and the mobile clients may occur asynchronously such that commands and/or inquiries may be received at each mobile client at different times and at different locations in the venue; such commands and/or inquires may direct each of the mobile clients to take different paths in order to maximize the information to be obtained from the different paths. In some implementations, the one or more mobile devices comprise crowdsourcing mobile devices configured to collect data for a server through crowdsourcing; and where the crowdsourcing mobile devices receive directions interactively from the server about the plurality of paths to navigate in the venue. In some other implementations, the one or more mobile devices comprise surveying mobile devices configured to collect data through the plurality of paths predetermined by the server; and where the surveying mobile devices follow the plurality of paths to navigate the venue.

According to embodiments of the present disclosure, the methods performed in block 810 may further include methods performed in block 818. Methods performed in block 818 may further include methods performed in block 822. In block 818, the processor 714 can be configured to identify access points in the venue, store locations of the access points, store characteristics of the access points, and store signal strength of the access points along the plurality of paths. In block 822, the processor 714 can be configured to provide navigation guidance to the one or more mobile devices using the model of the venue.

Note that at least the subsequent three paragraphs, FIG. 7, FIG. 8 and their corresponding descriptions provide means for identifying a set of constraints associated with a venue, means for determining a plurality of paths to be traveled by one or more mobile devices in accordance with the set of constraints, means for directing the one or more mobile devices to navigate the venue using the plurality of paths, means for receiving data collected by the one or more mobile devices, and means for generating a model of the venue using the data collected by the one or more mobile devices. At least the subsequent three paragraphs, FIG. 5, FIG. 6, FIG. 8 and their corresponding descriptions provide means for receiving from a server a plurality of paths to be traveled in accordance with a set of constraints associated with a venue at an apparatus, means for navigating the venue using the plurality of paths, means for collecting data observed from the plurality of paths, and means for reporting data collected to the server.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media and/or other non-transitory media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of modeling characteristics of a venue, comprising:
   identifying a set of constraints associated with the venue, wherein a constraint in the set of constraints comprises a measurement time, which is an amount of survey time available;
   determining a plurality of paths to be traveled by one or more mobile devices in accordance with the set of constraints;
   directing the one or more mobile devices to navigate the venue using the plurality of paths;
   receiving data collected by the one or more mobile devices, wherein the determining the plurality of paths to be traveled by the one or more mobile devices further comprises updating the plurality of paths dynamically based at least in part on the data collected by the one or more mobile devices; and
   generating a model of the venue using the data collected by the one or more mobile devices.

2. The method of claim 1, wherein the set of constraints comprises:
   number of measurements to be taken; and
   number of mobile devices to navigate the venue using the plurality of paths.

3. The method of claim 2, further comprises:
   receiving one or more of a start location, an end location, and/or a path length; and
   determining a plurality of paths to be traveled by the one or more mobile devices in accordance with the set of constraints, the one or more of the start location, the end location and/or the path length.

4. The method of claim 1, wherein determining the plurality of paths to be traveled by the one or more mobile devices comprises:
   determining each path in the plurality of paths has a cost bounded by a predetermined cost value.

5. The method of claim 4, wherein determining the plurality of paths to be traveled by the one or more mobile devices further comprises:
   computing a first cost associated with a shortest path from a start location to an end location;
   for the each path in the plurality of paths,
   computing a second cost associated with the each path from the start location to the end location; and
   determining a difference between the second cost and the first cost is less than a predetermined value.

6. The method of claim 5, wherein at least one path in the plurality of paths is different than the shortest path from the start location to the end location.

7. The method of claim 1, wherein directing the one or more mobile devices to navigate the venue comprises at least one of:
   sending inquiries to the one or more mobile devices asynchronously in response to the data collected by the one or more mobile devices; and
   sending updates of the plurality of paths to the one or more mobile devices asynchronously in response to the data collected by the one or more mobile devices.

8. The method of claim 1, wherein the one or more mobile devices comprise crowdsourcing mobile devices configured to collect data for a server through crowdsourcing; and wherein the crowdsourcing mobile devices receive directions interactively from the server about the plurality of paths to navigate in the venue.

9. The method of claim 1, wherein the one or more mobile devices comprise surveying mobile devices configured to collect data through the plurality of paths predetermined by a server; and wherein the surveying mobile devices follow the plurality of paths to navigate the venue.

10. The method of claim 1, wherein generating the model of the venue comprising:
    identifying access points in the venue;
    storing locations of the access points;
    storing characteristics of the access points; and
    storing signal strength of the access points along the plurality of paths.

11. The method of claim 10 further comprising:
    providing navigation guidance to the one or more mobile devices using the model of the venue.

12. An apparatus configured to model characteristics of a venue, comprising:
    one or more processors including processing logic, the processing logic comprising:
    logic configured to identify a set of constraints associated with the venue, wherein a constraint in the set of constraints comprises a measurement time, which is an amount of survey time available;
    logic configured to determine a plurality of paths to be traveled by one or more mobile devices in accordance with the set of constraints;
    logic configured to direct the one or more mobile devices to navigate the venue using the plurality of paths;
    logic configured to receive data collected by the one or more mobile devices, wherein the logic configured to determine the plurality of paths to be traveled by the one or more mobile devices further comprises logic configured to update the plurality of paths dynamically based at least in part on the data collected by the one or more mobile devices; and
    logic configured to generate a model of the venue using the data collected by the one or more mobile devices.

13. The apparatus of claim 12, wherein logic configured to determine the plurality of paths to be traveled by the one or more mobile devices comprises:
    logic configured to determine each path in the plurality of paths has a cost bounded by a predetermined cost value.

14. The apparatus of claim 13, wherein logic configured to determine the plurality of paths to be traveled by the one or more mobile devices further comprises:
    logic configured to compute a first cost associated with a shortest path from a start location to an end location;
    for the each path in the plurality of paths,
    logic configured to compute a second cost associated with the each path from the start location to the end location; and
    logic configured to determine a difference between the second cost and the first cost is less than a predetermined value.

15. The apparatus of claim 14, wherein at least one path in the plurality of paths is different than the shortest path from the start location to the end location.

16. The apparatus of claim 12, wherein logic configured to direct the one or more mobile devices to navigate the venue comprises at least one of:
    logic configured to send inquiries to the one or more mobile devices asynchronously in response to the data collected by the one or more mobile devices; and
    logic configured to send updates of the plurality of paths to the one or more mobile devices asynchronously in response to the data collected by the one or more mobile devices.

17. The apparatus of claim 12, wherein the one or more mobile devices comprise crowdsourcing mobile devices configured to collect data for the apparatus through crowdsourcing; and wherein the crowdsourcing mobile devices receive directions interactively from the apparatus about the plurality of paths to navigate in the venue.

18. The apparatus of claim 12, wherein the one or more mobile devices comprise surveying mobile devices configured to collect data through the plurality of paths predetermined by the apparatus; and wherein the surveying mobile devices follow the plurality of paths to navigate the venue.

19. The apparatus of claim 12, wherein logic configured to generate the model of the venue comprising:
    logic configured to identify access points in the venue;
    logic configured to store locations of the access points;
    logic configured to store characteristics of the access points; and
    logic configured to store signal strength of the access points along the plurality of paths.

20. A computer program product for modeling characteristics of a venue, comprising a non-transitory medium storing computer programs for execution by one or more computer systems, the computer program product comprising:
    code for identifying a set of constraints associated with the venue, wherein a constraint in the set of constraints comprises a measurement time, which is an amount of survey time available;
    code for determining a plurality of paths to be traveled by one or more mobile devices in accordance with the set of constraints;
    code for directing the one or more mobile devices to navigate the venue using the plurality of paths;

code for receiving data collected by the one or more mobile devices, wherein the code for determining the plurality of paths to be traveled by the one or more mobile devices further comprises code for updating the plurality of paths dynamically based at least in part on the data collected by the one or more mobile devices; and code for generating a model of the venue using the data collected by the one or more mobile devices.

21. The computer program product of claim 20, wherein code for determining the plurality of paths to be traveled by the one or more mobile devices comprises:

code for determining each path in the plurality of paths has a cost bounded by a predetermined cost value.

22. The computer program product of claim 21, wherein code for determining the plurality of paths to be traveled by the one or more mobile devices further comprises:

code for computing a first cost associated with a shortest path from a start location to an end location;

for the each path in the plurality of paths, code for computing a second cost associated with the each path from the start location to the end location; and code for determining a difference between the second cost and the first cost is less than a predetermined value.

23. The computer program product of claim 22, wherein at least one path in the plurality of paths is different than the shortest path from the start location to the end location.

24. The computer program product of claim 20, wherein code for directing the one or more mobile devices to navigate the venue comprises at least one of:

code for sending inquiries to the one or more mobile devices asynchronously in response to the data collected by the one or more mobile devices; and code for sending updates of the plurality of paths to the one or more mobile devices asynchronously in response to the data collected by the one or more mobile devices.

25. The computer program product of claim 20, wherein the one or more mobile devices comprise crowdsourcing mobile devices configured to collect data for a server through crowdsourcing; and wherein the crowdsourcing mobile devices receive directions interactively from the server about the plurality of paths to navigate in the venue.

26. The computer program product of claim 20, wherein the one or more mobile devices comprise surveying mobile devices configured to collect data through the plurality of paths predetermined by a server; and wherein the surveying mobile devices follow the plurality of paths to navigate the venue.

27. The computer program product of claim 20, wherein code for generating the model of the venue comprising:

code for identifying access points in the venue;

code for storing locations of the access points;

code for storing characteristics of the access points; and code for storing signal strength of the access points along the plurality of paths.

28. A mobile device for modeling characteristics of a venue, comprising:

one or more processors including processing logic, the processing logic comprising:

logic configured to receive from a server a plurality of paths to be traveled in accordance with a set of constraints associated with a venue, wherein a constraint in the set of constraints comprises a measurement time, which is an amount of survey time available;

logic configured to navigate the venue using the plurality of paths;

logic configured to collect data observed from the plurality of paths, wherein the plurality of paths are updated dynamically based at least in part on the data collected by one or more mobile devices; and logic configured to report data collected to the server in order to generate a model of the venue.

29. The mobile device of claim 28, wherein the set of constraints comprises:

number of measurements to be taken; and number of mobile devices to navigate the venue using the plurality of paths.

30. The mobile device of claim 29, further comprises:

logic configured to receive one or more of a start location, an end location, and/or a path length; and logic configured to determine a plurality of paths to be traveled by the one or more mobile devices in accordance with the set of constraints, the one or more of the start location, the end location and/or the path length.

31. The mobile device of claim 28, wherein the plurality of paths to be traveled is determined based at least in part on a cost bounded by a predetermined cost value.

32. The mobile device of claim 21, wherein the plurality of paths to be traveled is determined based at least in part on:

a first cost associated with a shortest path from a start location to an end location;

for the each path in the plurality of paths, a second cost associated with the each path from the start location to the end location; and a difference between the second cost and the first cost is less than a predetermined value.

33. The mobile device of claim 32, wherein at least one path in the plurality of paths is different than the shortest path from the start location to the end location.

34. The mobile device of claim 28, wherein the plurality of paths to be traveled further comprises:

dynamically updated paths based at least in part on the data collected.

35. The mobile device of claim 28, wherein logic configured to navigate the venue comprises at least one of:

logic configured to receive inquiries from the server asynchronously in response to the data collected; and logic configured to receive updates of the plurality of paths from the server asynchronously in response to the data collected.

36. The mobile device of claim 28, wherein the mobile device comprises a crowdsourcing mobile device configured to collect data for the server through crowdsourcing; and wherein the mobile device receives directions interactively from the server about the plurality of paths to navigate in the venue.

37. The mobile device of claim 28, wherein the mobile device comprises a surveying mobile device configured to collect data through the plurality of paths predetermined by the server; and wherein the mobile device follows the plurality of paths to navigate the venue.

38. The mobile device of claim 28, wherein the data collected comprises:

access points in the venue;

locations of the access points;

characteristics of the access points; and signal strength of the access points along the plurality of paths.

39. An apparatus, comprising:

means for identifying a set of constraints associated with a venue, wherein a constraint in the set of constraints comprises a measurement time, which is an amount of survey time available;

means for determining a plurality of paths to be traveled by one or more mobile devices in accordance with the set of constraints;

means for directing the one or more mobile devices to navigate the venue using the plurality of paths;

means for receiving data collected by the one or more mobile devices, wherein the means for determining the plurality of paths to be traveled by the one or more mobile devices further comprises means for updating the plurality of paths dynamically based at least in part on the data collected by the one or more mobile devices; and means for generating a model of the venue using the data collected by the one or more mobile devices.

40. A method for modeling characteristics of a venue, comprising:

receiving from a server a plurality of paths to be traveled in accordance with a set of constraints associated with a venue at a mobile device, wherein a constraint in the set of constraints comprises a measurement time, which is an amount of survey time available;

navigating the venue using the plurality of paths;

collecting data observed from the plurality of paths, wherein the plurality of paths are updated dynamically based at least in part on the data collected by one or more mobile devices; and reporting data collected to the server in order to generate a model of the venue.

41. The method of claim 40, wherein navigating the venue comprises at least one of:

receiving inquiries from the server asynchronously in response to the data collected; and receiving updates of the plurality of paths from the server asynchronously in response to the data collected.

42. The method of claim 40, wherein the mobile device comprises a crowdsourcing mobile device configured to collect data for the server through crowdsourcing; and wherein the mobile device receives directions interactively from the server about the plurality of paths to navigate in the venue.

43. The method of claim 40, wherein the mobile device comprises a surveying mobile device configured to collect data through the plurality of paths predetermined by the server; and wherein the mobile device follows the plurality of paths to navigate the venue.

44. A computer program product for modeling characteristics of a venue, comprising a non-transitory medium storing computer programs for execution by one or more processors, the computer program product comprising:

code for receiving from a server a plurality of paths to be traveled in accordance with a set of constraints associated with a venue at a mobile device, wherein a constraint in the set of constraints comprises a measurement time, which is an amount of survey time available;

code for navigating the venue using the plurality of paths;

code for collecting data observed from the plurality of paths, wherein the plurality of paths are updated dynamically based at least in part on the data collected by one or more mobile devices; and code for reporting data collected to the server in order to generate a model of the venue.

45. The computer program product of claim 44, wherein code for navigating the venue comprises at least one of:

code for receiving inquiries from the server asynchronously in response to the data collected; and code for receiving updates of the plurality of paths from the server asynchronously in response to the data collected.

46. The computer program product of claim 44, wherein the mobile device comprises a crowdsourcing mobile device configured to collect data for the server through crowdsourcing; and wherein the mobile device receives directions interactively from the server about the plurality of paths to navigate in the venue.

47. The computer program product of claim 44, wherein the mobile device comprises a surveying mobile device configured to collect data through the plurality of paths predetermined by the server; and wherein the mobile device follows the plurality of paths to navigate the venue.

48. An apparatus, comprising:

means for receiving from a server a plurality of paths to be traveled in accordance with a set of constraints associated with a venue at the apparatus, wherein a constraint in the set of constraints comprises a measurement time, which is an amount of survey time available;

means for navigating the venue using the plurality of paths;

means for collecting data observed from the plurality of paths, wherein the plurality of paths are updated dynamically based at least in part on the data collected by one or more mobile devices; and means for reporting data collected to the server in order to generate a model of the venue.

49. The method of claim 1, wherein directing the one or more mobile devices comprises:

dynamically adjusting a first path in the plurality of paths being travelled by a first mobile device based on a second path in the plurality of paths being travelled by a second mobile device.

* * * * *